United States Patent [19]

Winter

[11] Patent Number: 4,463,811
[45] Date of Patent: Aug. 7, 1984

[54] IMPLEMENT WITH LATERALLY MOVABLE FRAME STRUCTURE

[75] Inventor: David C. Winter, Des Moines, Iowa

[73] Assignee: Deere & Company, Moline, Ill.

[21] Appl. No.: 390,106

[22] Filed: Jun. 21, 1982

[51] Int. Cl.³ .............................................. A01B 69/06
[52] U.S. Cl. ...................................... 172/26; 172/679
[58] Field of Search .................... 172/5, 6, 23, 26, 98, 172/446, 476, 667, 679; 56/10.2, 15.4; 180/79, 131; 104/244.1

[56] References Cited

U.S. PATENT DOCUMENTS

| | | | |
|---|---|---|---|
| 3,208,535 | 9/1965 | Fischer | 172/6 |
| 3,603,405 | 9/1971 | Arnold et al. | 172/26 |
| 3,797,602 | 3/1974 | Sumida | 180/131 |
| 4,060,254 | 11/1977 | Ernst | 172/446 X |
| 4,136,508 | 1/1979 | Coleman et al. | 56/10.2 X |
| 4,161,143 | 7/1979 | Fasse et al. | 104/244.1 |
| 4,180,133 | 12/1979 | Collogan et al. | 172/26 |
| 4,184,551 | 1/1980 | Orthman | 172/26 |
| 4,228,860 | 10/1980 | Orthman | 172/26 |

FOREIGN PATENT DOCUMENTS

1058294  5/1959  Fed. Rep. of Germany ...... 172/446

*Primary Examiner*—Richard T. Stouffer

[57] ABSTRACT

A guidance system for use with tractor-mounted row crop cultivators and similar implements includes a pair of independent furrow followers mounted one behind the other on the implement for sensing implement position relative to a preestablished guidance furrow. Series-connected switches are controlled by furrow sensor arms to activate a solenoid valve-controlled hydraulic cylinder on a laterally movable parallel linkage hitch which replaces the standard three-point hitch on the implement. When the implement is raised from the ground, V-shaped stops under the sensor arms automatically position the sensors at the null point. Switches and an actuator on the hydraulic cylinder operate in response to movement of the tractor rockshaft to return the implement to center position in preparation for alignment with the next set of rows to be cultivated.

31 Claims, 9 Drawing Figures

IMPLEMENT WITH LATERALLY MOVABLE FRAME STRUCTURE

A guidance system for use with tractor-mounted row crop cultivators and similar implements includes a pair of independent furrow followers mounted one behind the other on the implement for sensing implement position relative to a preestablished guidance furrow. Series-connected switches are controlled by furrow sensor arms to activate a solenoid valve-controlled hydraulic cylinder on a laterally movable parallel linkage hitch which replaces the standard three-point hitch on the implement. When the implement is raised from the ground, V-shaped stops under the sensor arms automatically position the sensors at the null point. Switches and an actuator on the hydraulic cylinder operate in response to movement of the tractor rockshaft to return the implement to center position in preparation for alignment with the next set of rows to be cultivated.

BACKGROUND OF THE INVENTION

The present invention relates generally to agricultural implements, and more particularly to an automatic guidance system for row crop cultivators and similar implements.

When cultivating crops, it is very important that the tillage implement be carefully positioned with respect to the rows of plants to avoid crop loss. As the trend towards larger farm implements continues, the importance of proper guidance in the field is magnified since an error in positioning can destroy plants in numerous rows. Operator fatigue and reduced operator concentration, even for very short periods of time, can result in improper guidance with significant crop loss.

Various systems are available for automatic guidance but none have been entirely satisfactory. Some types, such as shown in U.S. Pat. No. 4,161,143, control the steering on the tractor, but these require additions or modifications to the tractor steering mechanism and do not provide quick, positive alignment of a rear-mounted implement with the crop rows, which is necessary to avoid plant damage.

Other types of guidance systems, such as exemplified in U.S. Pat. Nos. 4,184,551 and 4,228,860, utilize steerable rear coulters and have been found to do a satisfactory job of automatically positioning an implement in most conditions. However, the coulters and the framework required to mount the coulters on the implement are relatively heavy and therefore lift assist wheels must be added which increase the cost of the implement. With coulter guidance, the three-point hitch mounting the implement to the tractor is permitted to sway so that the coulters can move the implement transversely. Sway can be detrimental on slopes and hillsides, particularly when the implement is being lowered into the field-working position. As the three-point hitch drops below contact with sway blocks, which normally restrain side motion, the implement will fall down-slope until the coulters can act to properly align the implement with the rows. Often some plants are damaged or destroyed before the guidance system can adjust the implement. The steerable coulter systems, as well as other types of prior art systems, have lacked adequate controls to manually adjust the position of the implement with respect to the tractor or to lock the implement in a given lateral position with respect to the tractor.

Other types of systems for guiding implements have utilized toolbars connected to the tractor hitch structure with sliding or rolling members so that the toolbar can be shifted laterally to position the tools with respect to the rows of crops. Such a system is shown, for example, in U.S. Pat. No. 3,208,535. Although such a system can usually provide quick, positive toolbar shifting, the sliding or rolling members are subjected to heavy loading under adverse environmental conditions. Friction and wear result in a relatively short life expectancy of the sliding or rolling members, and binding can occur.

Another type of guidance system, exemplified in U.S. Pat. No. 4,180,133, utilizes a hydraulically controlled swinging drawbar hitch. Although adequate for towed implements, such a system is not adaptable for tractor-mounted implements such as row crop cultivators.

It is therefore an object of the present invention to provide an improved guidance system for use with agricultural implements. It is another object to provide such a system for a tractor-mounted implement.

It is a further object of the invention to provide an improved guidance system for an agricultural implement which overcomes the aforementioned problems of previously available systems.

It is another object of the present invention to provide a row guidance system for an implement which is lighter and more compact than at least some of the prior art systems, and which does not significantly increase the distance between the rear extremity of the implement and the rear of the tractor or towing vehicle.

It is yet another object to provide an improved guidance system for an implement which provides more positive and accurate control of the implement during end turns, particularly on sloping ground.

It is yet a further object of the present invention to provide an implement guidance system with enhanced automatic control for centering both the implement and furrow sensor when the implement is raised out of the ground. It is another object to provide such a system with improved control features for manually adjusting and fixing the transverse position of the implement with respect to the tractor, even on sloping ground.

It is still another object of the invention to provide an improved linkage for an implement guidance system for transversely positioning a toolbar with respect to the tractor hitch. It is another object to provide such a linkage which is reliable and compact and which does not significantly increase the weight of the implement or the distance that the implement projects rearwardly behind the tractor. It is a further object to provide a self-centering hydraulic cylinder arrangement for such a device.

In accordance with the above objects, a toolbar of a row crop cultivator or the like is connected to a tractor by a relatively compact parallel linkage hitch, which replaces the standard three-point hitch of the implement, to permit lateral movement in either direction from center. The parallel linkage hitch maintains the toolbar perpendicular to the forward direction and permits the sway blocks or other stabilizing means on the tractor three-point to be engaged during operation in the field for stability on slopes. A preestablished furrow or mark placed in the ground at planting is sensed by two independent furrow followers mounted on the toolbar one behind the other. The followers are mounted on trailing arms which pivot both vertically and laterally. Associated with each follower is a pair of switches, one on each side of the arm, activated by lateral movement of the follower. The switches on each side are connected in series. Lateral movement of the cultivator with respect to the furrow (and therefore the crop row) activates one set of series-connected switches which, in turn, operates a hydraulic positioning cylinder. The cylinder moves the toolbar to center the arms with respect to the switches and thereby position the cultivator with respect to the rows. The series-connected switches require both followers to indicate the same directional error to eliminate erratic signals caused by a follower bouncing over clods or other obstacles.

A V-shaped stop under each of the sensor arms automatically positions the followers at the null points when the implement is lifted from the ground. Two switches on the hydraulic positioning cylinder are energized as the implement is raised to automatically center the implement in preparation for alignment with the next rows to be cultivated. A jog or manual overrider switch is located in the tractor cab so the operator can move the implement transversely to override automatic steering when the implement is not lined up properly with the rows. The implement may be positively steered uphill and held in position when necessary for proper alignment on slopes.

These and other objects, features and advantages of the present invention will become apparent to those skilled in the art from the description which follows when taken with the accompanying drawings.

DESCRIPTION OF THE PREFERRED EMBODIMENT

Figure 1:
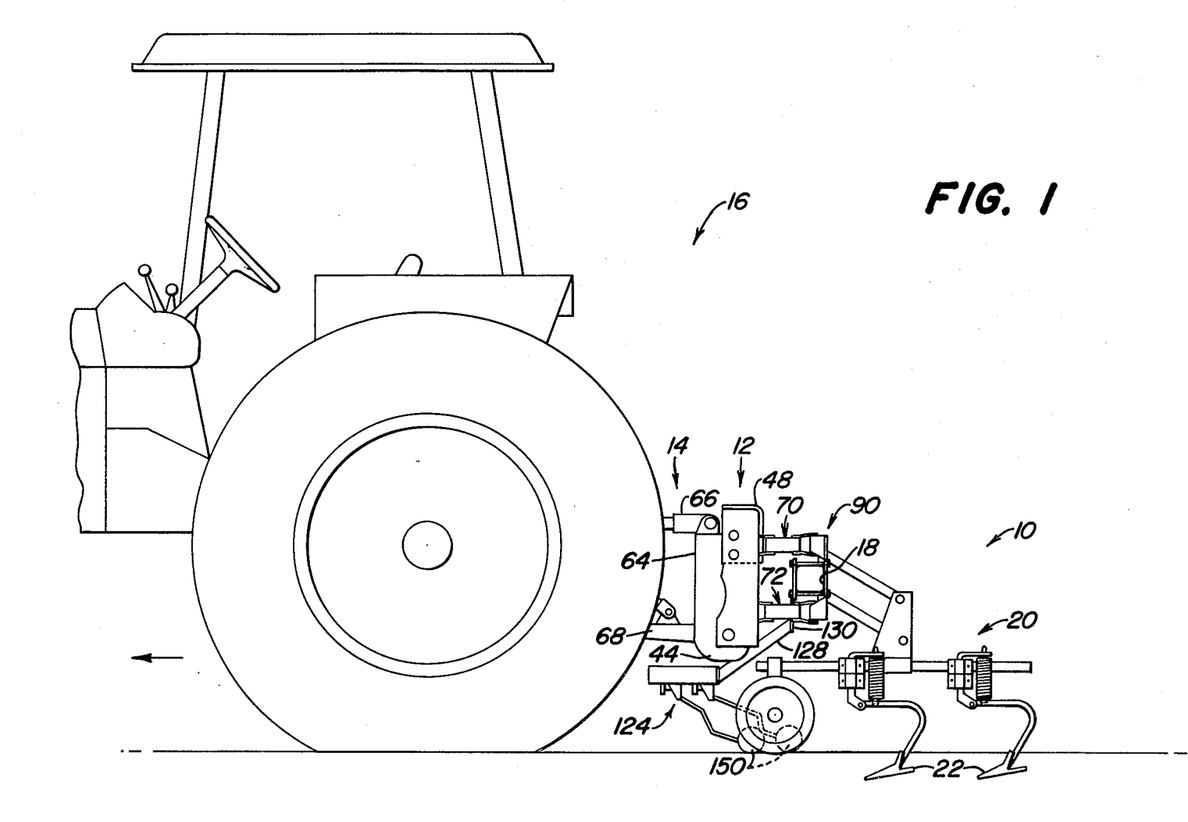
FIG. 1 is a side view of a tractor-mounted row crop cultivator attached to the tractor and embodying the principles of the present invention.

Referring now to FIG. 1, therein is shown a conventional row crop cultivator 10 connected by hitch structure 12 to the three-point hitch 14 of a tractor or towing vehicle 16. The row crop cultivator 10 includes a transverse tool-carrying frame or toolbar 18 supporting a plurality of transversely spaced cultivating rigs 20 each having a plurality of earth-working tools 22. The rigs 20 are spaced such that when the cultivator 10 is towed forwardly through a field of row crops and is properly aligned with the rows, the earth-working tools 22 will work the soil between the rows without contacting the plants.

Figure 2:
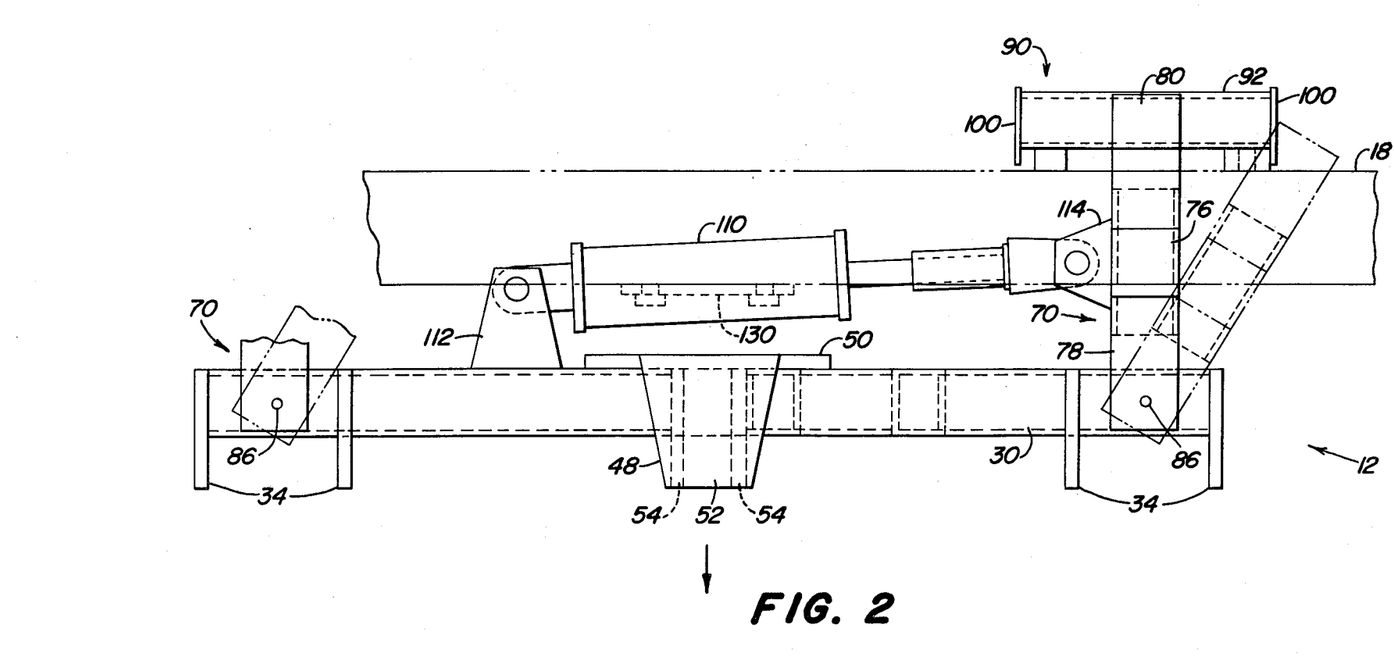
FIG. 2 is a plan view of a portion of the laterally shiftable hitch structure connected to the main transverse beam of the cultivator shown in FIG. 1.
Figure 3:
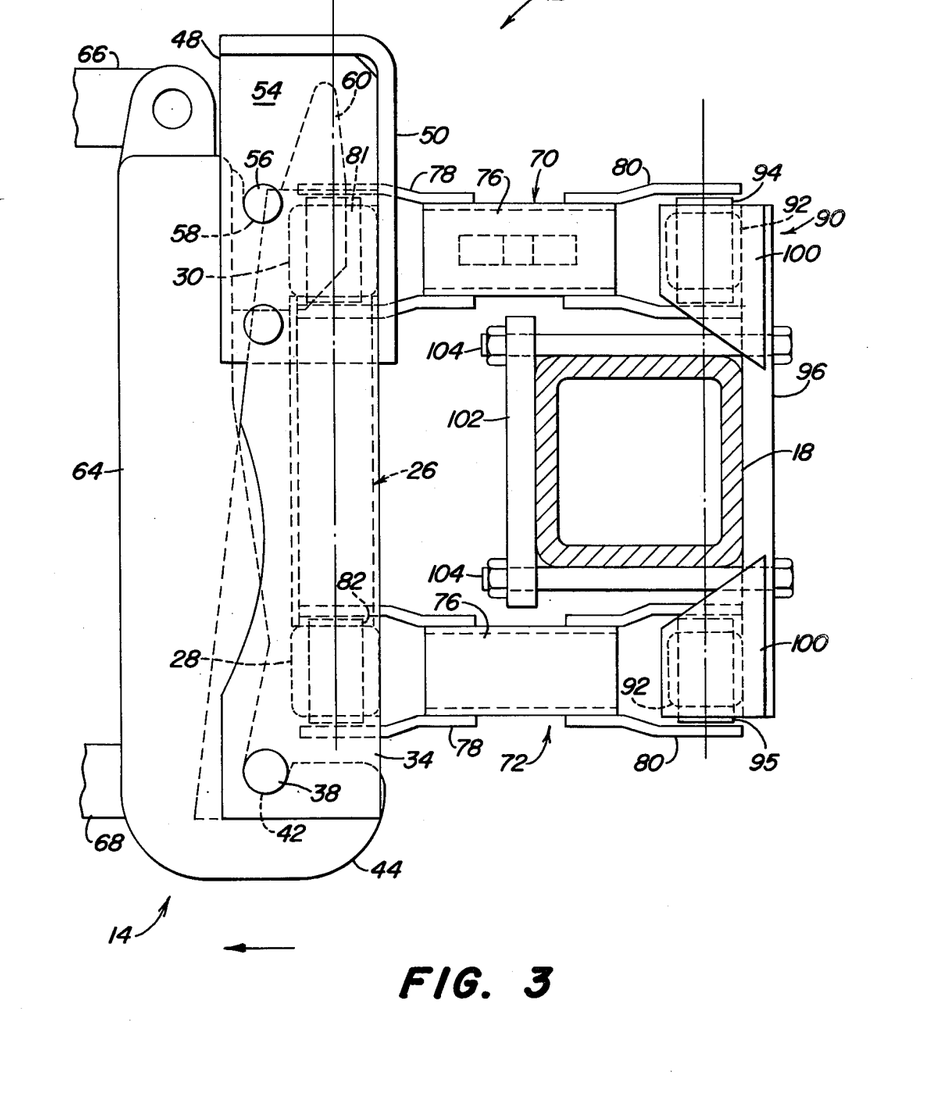
FIG. 3 is a side view of the hitch structure.
Figure 4:
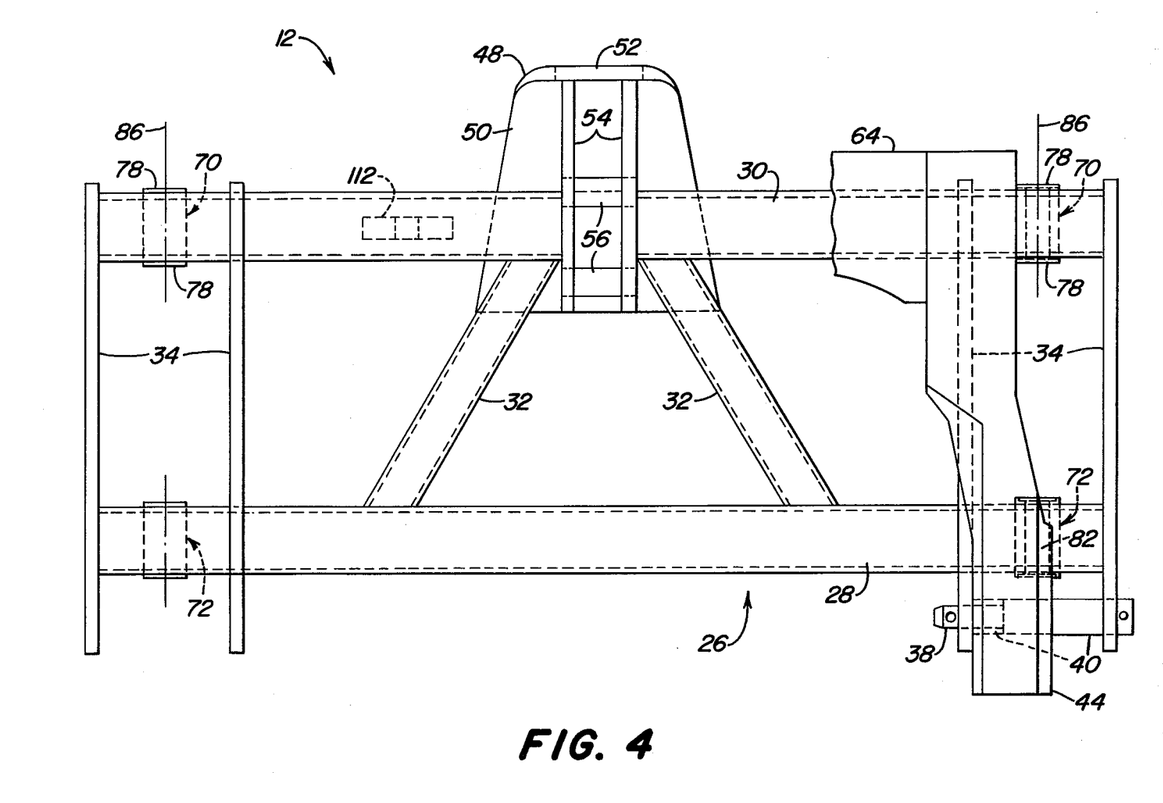
FIG. 4 is a front view of the hitch structure with a portion of the attachment frame on the tractor three-point hitch partially broken away to more clearly show the framework.

As best seen in FIGS. 1-4, the hitch structure 12 includes main upright framework 26 having a pair of vertically spaced and transversely extending tubular beams 28 and 30 connected by inner diagonal beam members 32. The outer ends of the tubular beams 28 and 30 are connected by transversely spaced, parallel plates 34 which, as best seen in FIG. 4., extend downwardly below the bottom of the tubular beam 28. The lower portion of each pair of plates 34 is apertured, and a pin 38 extending through the apertures carries bushings 40 which are received in a downwardly directed recess 42 of the lower hook portion 44 of the three-point hitch 14. A reinforced upper bracket 48 includes a rear portion 50 extending upwardly from the top of the diagonal beam members 32. A top portion 52 extends forwardly above the tubular beam 30. A pair of upright plates 54 are welded to the tubular beam 30 and to the rear and top portions 50 and 52 and carry a pair of vertically spaced pins 56 which are centrally located between the lower pins 38. The upper pin 56 is received in an upwardly opening recess of upper hook portion 60 of the three-point hitch 14. The hooked portions 44 and 60 are part of a quick attachment frame 64 connected to an upper arm 66 and a pair of lower arms 68 of the three-point hitch 14. The frame 64 permits the hitch structure 12 to be quickly and easily connected to or disconnected from the three-point hitch.

The transverse tool-carrying frame 18 is supported from, and transversely rockable with respect to, the main upright framework 26 by first and second rigid arms 70 extending above the frame 18 and by third and fourth rigid arms 72 extending below the frame 18. Each of the rigid arms 70 and 72 includes a short tubular beam 76 with front and rear hinge structure 78 and 80 welded to the opposite vertical faces of the respective ends of the beam 76. The hinge structure 78 for the upper arms 70 is pivotally connected to the tubular beam 30 between the side plates 34 by bearings 81. The lower arms 72 are connected in similar fashion by bearings 82 to the lower beam 28. In the preferred embodiment, as best viewed in FIG. 4, the upper and lower arms 70 and 72, respectively, on each side are vertically aligned and are constrained to rock about a vertical pivotal axis 86. The arms 70 and 72 are supported in substantially cantilever fashion from the respective beams 30 and 28, and the structure of the main upright framework 26 prevents any significant rocking of the arms other than about the vertical axes 86.

The transverse frame 18, which in the preferred embodiment is tubular and has a rectangular cross section, is supported from the upright framework 26 by the four arms 70 and 72. As best seen in FIG. 3, the beam is supported between the upper and lower arms 70 and 72, respectively, immediately behind the framework 26 by a pair of transversely spaced brackets 90 pivotally connected to the respective arm pairs 70, 72. Each bracket 90 includes upper and lower transverse bracket beams 92 pivotally connected to the hinge portions 80 by centrally located bearings 94 and 95, respectively. Vertical straps or plates 96 are welded to the aft faces of the bracket beams 92 and vertically space the bearings 94 and 95 a distance equal to that of the spacings between the corresponding bearings 81 and 82 located in the upright framework 26. Gussets 100 are welded to the ends of the bracket beams 92 and to the vertical straps 96. The beam 18 is secured between the rear vertical straps 96 and forward vertical straps 102 by bolts 104 passing through the straps adjacent the opposite vertical faces of the beam. The brackets 90 are adjusted so that the four arms 70 and 72 are parallel to each other and are constrained to rock in unison with each other. The arms 70 and 72 thereby form with the upright framework 26 and the portion of the frame 18 between the brackets 90 four-bar parallel linkage structure which permits the frame 18 to rock transversely while remaining substantially perpendicular to the forward direction of travel. The arms 70 and 72 transmit the entire draft load from the cultivator 10 to the three-point hitch 14. When the three-point hitch structure 14 is raised from the position shown in FIG. 1, substantially the entire weight of the row crop cultivator 10 is carried by the arms 70 and 72 from the main upright framework 26.

A double-acting hydraulic cylinder 110 is connected to the upper beam 30 of the main framework 26 by a bracket 112. The rod end of the cylinder 110 is connected to a bracket 114 which is welded to the inside face of the upper left-hand (as viewed in the direction of travel) arm 70. As the cylinder 110 is extended from the position shown in FIG. 2, the arms are rocked to the left (broken lines) to move the implement frame left with respect to the fore-and-aft center line of the tractor. Retracting the cylinder 110 from the position shown in FIG. 2 moves the implement to the right with respect to the center line of the tractor. The parallel linkage arrangement provided by the arms 70 and 72 permits the frame 18 to be moved laterally over a relatively wide range of positions while maintaining the frame close to the framework 26 and transverse to the forward direction of travel.

The hydraulic cylinder 110 is connected to a source of hydraulic fluid on the tractor 16 and to suitable control means for extending and retracting the cylinder as necessary to align the implement 10 with the rows of crops. Although the hitch structure 12 is shown with a row crop cultivator 10, it is to be understood that the structure may also be utilized with other types of implements where it is necessary to make lateral adjustments of the frame.

In the preferred embodiment, the cylinder 110 is connected to a solenoid controlled valve 120 (FIG. 9) which, when the implement is in the field-working position shown in FIG. 1, is automatically controlled by a furrow sensor 124 to maintain a preselected lateral position of the frame 18 with respect to a preestablished furrow or groove in the ground. The valve 120 is a conventional three-position, four-way, closed center valve or the like which when unactivated prevents movement of the cylinder 110 and thereby fixes the frame 18 with respect to the three-point hitch 14. Sway blocks (not shown) or other conventional means are provided to prevent the hitch 14 from rocking laterally on the tractor for better implement control, particularly on sloping ground.

Figure 5:
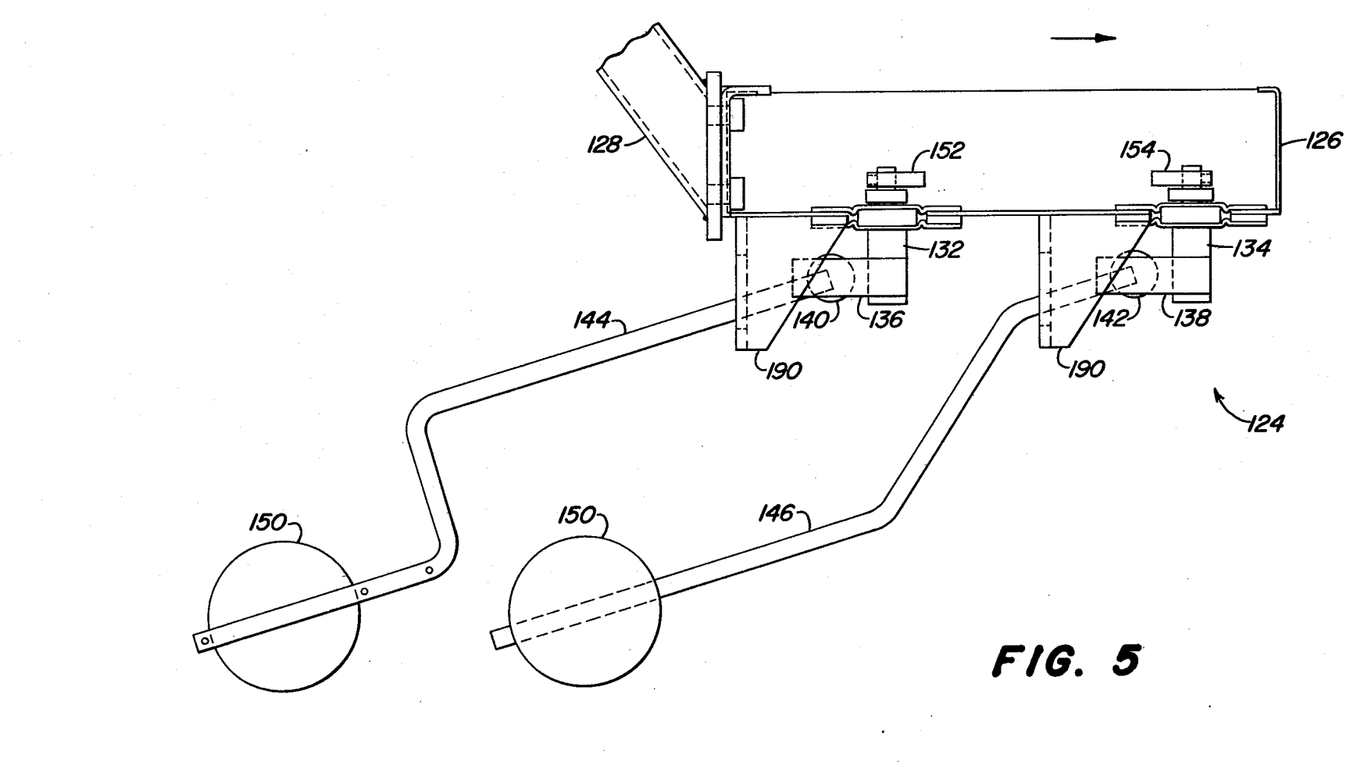
FIG. 5 is a side view of the furrow follower assembly utilized with the cultivator of FIG. 1.

The furrow sensor 124 includes a rigid switch box 126 connected to the forward end of a downwardly and forwardly directed support tube 128 attached to the forward face of the transverse frame 18 by a conventional bracket arrangement 130 (FIGS. 1 and 2). Fore-and-aft spaced vertical shafts 132 and 134 are journalled for rotation about upright axes in the bottom of the switch box 126. Pivot supports 136 and 138 are fixed to the lower portions of the vertical shafts 132 and 134, respectively, and carry pivots 140 and 142 for rocking about generally horizontal pivotal axes. Follower arms 144 and 146 are connected to the pivots 140 and 142, respectively, for rocking vertically about the horizontal axis and for rocking laterally about the axes of the respective shafts 132 and 134. Relatively heavy round ball-shaped followers 150 are connected to the aft ends of the arms 144 and 146 and are adapted to ride in a furrow or groove in the ground formed during a preceding planting or cultivating operation. The aft end of the arm 144 is bent at ninety degree angles (FIG. 5) to provide clearance with respect to the forward ball 150. The forward portion of the arm 146 is bent at opposite obtuse angles to provide clearance between the vertical shaft 132 and the arm. The switch box 126 is fixed with respect to the frame 18 such that when the row crop cultivator 10 is properly aligned with the rows of crops and the balls 150 are in the preestablished furrow or groove, the arms 144 and 146 will be in direct trailing relationship and parallel to each other and to the forward direction.

Figure 6:
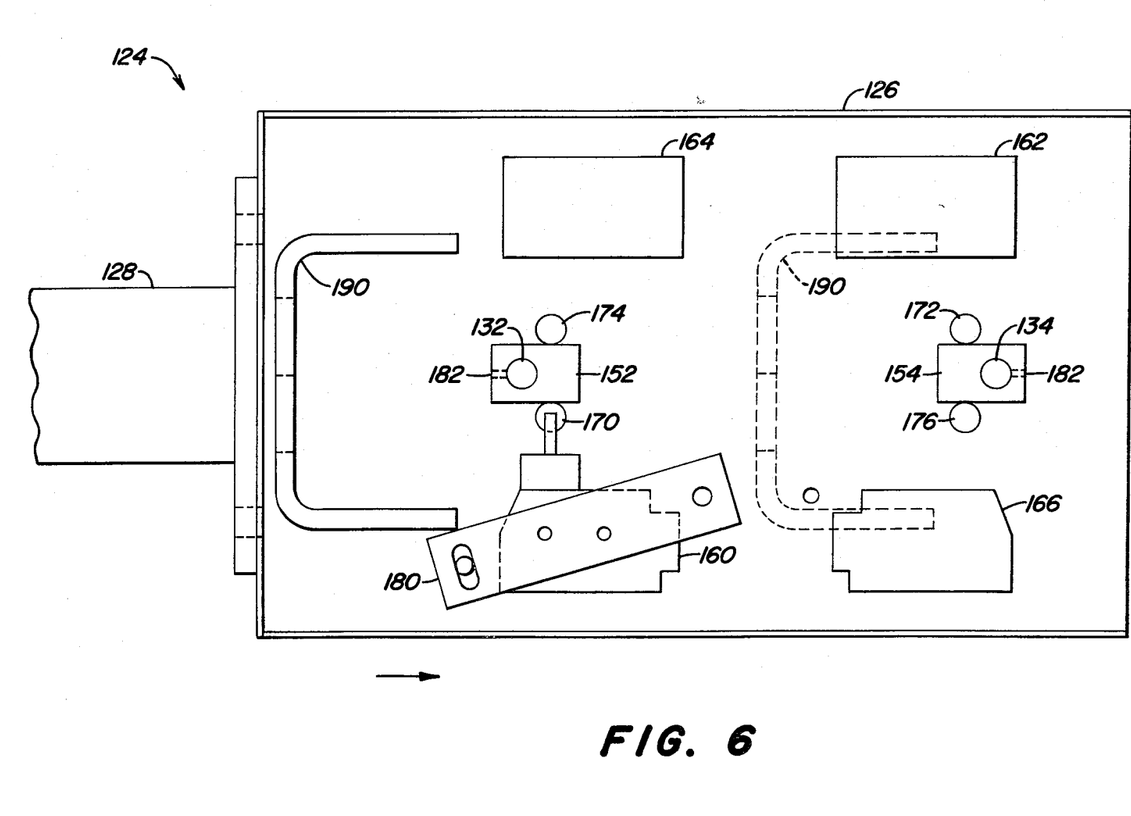
FIG. 6 is a top view of the switch box utilized with the follower assembly of FIG. 5 with portions removed to more clearly show the arrangement of switches and the guide members for centering the follower arms when the implement is raised from the field-working position.

Actuator arms 152 and 154 are connected to the shafts 132 and 134 inside the switch box 126. Microswitches 160–166 (FIG. 6) are fixed to the switch box 126 on opposite sides of the arms 152 and 154 and include actuators 170–176. The position of the actuators 170–176 with respect to the arms 152 and 154 are transversely adjustable, for example by an adjustable bracket assembly 180 or other conventional mounting structure. The angular position of the arms 152 and 154 can also be adjusted with respect to the shafts 132 and 134 by loosening the setscrew 182.

Figure 9:
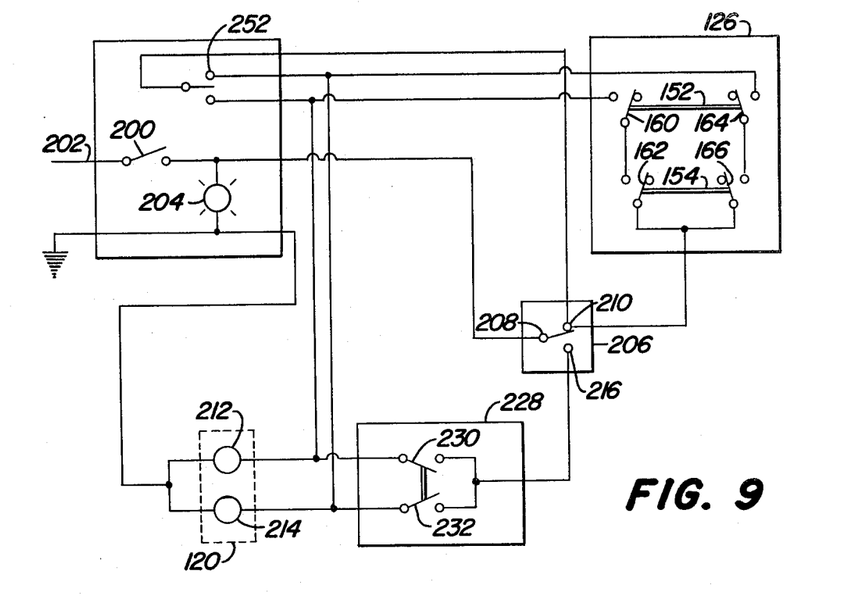
FIG. 9 is a circuit diagram showing the arrangement of the various electrical components in the guidance system.

The microswitches 160–166 are normally off (FIG. 9). However, as the arms 144 and 146 move laterally from the direct trailing position of FIGS. 5 and 6, the actuator arms 152 and 154 will activate the switches 160 and 162, or 164 and 166, depending on whether the arms move to the left or the right with respect to the switch box 126.

Figure 7:
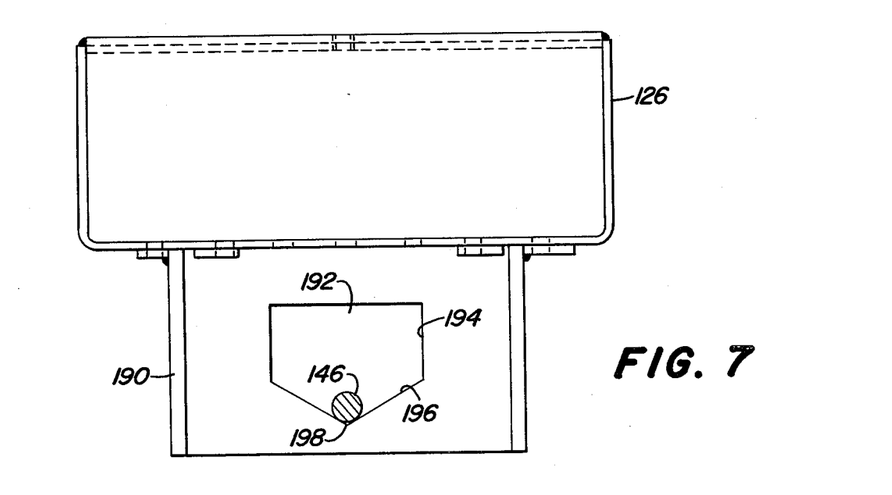
FIG. 7 is a front view of the switch box of FIG. 6 showing the shape of the notch in the guide member.

The forward ends of the arms 144 and 146 extend through apertures 192 in upright guide members 190 connected to the bottom of the switch box 126. As best seen in FIG. 7, each aperture 192 has an upper rectangularly shaped portion 194 and a lower V-shaped notch 196 with a center apex 198. The forward ends of the arms 144 and 146 are so positioned that when the implement is in the field-working position shown in FIG. 1, the arms can rock both vertically and horizontally generally between the sides of the rectangular portion 194. As the three-point hitch 14 is raised and the implement is lifted from the ground, the arms 144 and 146 will rock about the pivots 140 and 142, respectively, until the arms contact the V-shaped notches 196. Continued lifting of the implement causes the arms to settle toward the central apexes 198 to thereby center the arms in direct trailing relationship with respect to each other to assure that the switches 160–166 are in the off position when the implement is raised.

To guide the implement automatically, the operator closes switch 200 (FIG. 9) which is connected via line 202 to the vehicle battery or other power source. An indicator lamp 204 is illuminated to remind the operator that this system is in the one condition. A two-position lift switch 206, operably associated with the tractor rockshaft, includes an input terminal 208 connected to the switch 200 and a first output terminal 210 connected to the switches 162 and 166. The switch 162 is connected in series with the switch 160 which in turn is connected to a left solenoid 212 of the solenoid control valve 120. The switch 166 is connected in series with the switch 164 which in turn is connected to a right solenoid 214 of the valve 120. When the rockshaft is positioned such that the three-point hitch 14 is lowered and the cultivator 10 is in the field-working position of FIG. 1, the lift switch 206 is in the position shown in FIG. 9 and power is supplied to the switch box 126. As the rockshaft is rocked to raise the hitch 14 and lift the implement 10 from the ground, the lift switch 206 is switched to the second position wherein the terminal 208 is connected to the terminal 216.

In operation, assuming that the implement is lowered in the field-working position and switch 200 is closed, the switches 160–166 will remain in the off condition so long as the frame 18 is properly aligned with respect to the preestablished furrow in the soil so that the arms 144 and 146 trail directly rearwardly of the switch box 126. If the frame 18 begins to move left with respect to the preestablished furrow, the balls 150 will remain in the furrow and cause the arms to pivot to the right about the vertical shafts 132 and 134 to thereby close the switches 164 and 166. Current then flows through the solenoid 214 causing the hydraulic cylinder 110 to retract and shift the frame 18 toward the right until the arms 144 and 146 are again properly centered and in direct trailing relation. If the frame 18 moves too far to the right with respect to the preestablished furrow, the switches 160 and 162 are closed and solenoid 212 is activated to extend the cylinder and rock the frame to the left. In the preferred embodiment when the frame 18 is properly positioned with respect to the preestablished furrow, neither of the valves 212 or 214 is activated and fluid flow in and out of the cylinder 110 is completely blocked so that the frame 18 is locked with respect to the upright framework 26. In order to effect operation of one of the solenoids 212 or 214 and move the frame 18, both switches of a series-connected pair 160, 162 or 164, 166 must be closed. Therefore, both of the follower arms 144 and 146 must be pivoted the same direction away from center before the solenoid will be operated to shift the frame. This feature prevents unwanted shifts of the frame resulting from one of the follower balls 150 jumping out of the furrow, for example, when the ball hits a clod. The balls 150 are made of solid metal which provides sufficient weight to maintain them in the furrow. The direct in-line trailing relationship of the arms 144 and 146 functions to direct the balls 150 back towards the furrow if they happen to bounce out after hitting a clod or other obstruction. Also, as the implement is raised, the arms 144 and 146 are centered with respect to the switch box 126 by the V-shaped notches 196. The range of arm positions wherein the switches 160–166 will be in the off position is determined by the setting of the adjustable bracket assemblies 180.

Figure 8:
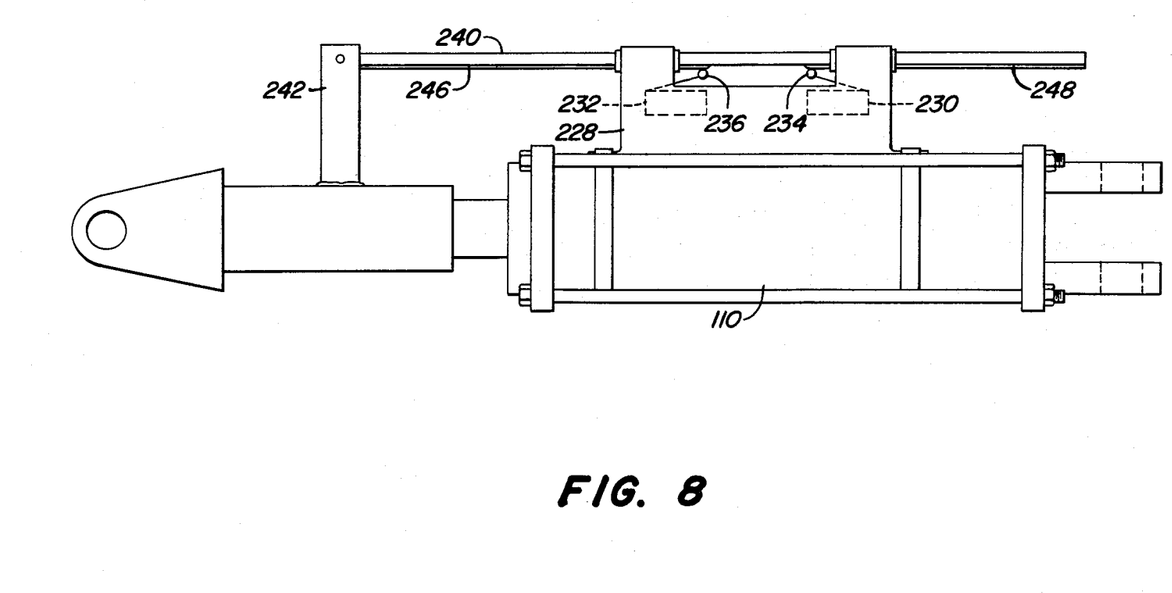
FIG. 8 is a rear view of the cylinder shown in FIG. 2 including the switch and actuator assembly utilized to center the implement with respect to the tractor.

As the implement is raised from the ground, the lift switch 206 is switched from the position shown in FIG. 9 to provide contact between the terminals 208 and 216. The terminal 216 is connected to a switch assembly 228 including a switch 230 connected to the solenoid 212 and a switch 232 connected to the solenoid 214. The switches 230 and 232 include actuators 234 and 236 (FIG. 8) which contact a slide member 240. The slide member 240 is connected by a bracket 242 to the rod end of the cylinder and moves therewith as the cylinder is extended and retracted. The slide 240 includes cam surfaces 246 and 248 which maintain both of the switches 230 and 232 in the off condition when the cylinder is extended to a preselected distance, preferably about half the stroke of the piston. Retraction of the cylinder from the preselected position shown in FIG. 8 activates the switch 230 while extension beyond the position activates the switch 232. When the implement is raised, the switch 206 switches the power to the terminal 216, and the switch assembly 228 activates the required solenoid to move the cylinder 110 to the preselected position. Preferably the cylinder, when in the preselected position, establishes the beam 18 in a transverse position centrally between the leftmost and the rightmost lateral positions of the frame 18. As the implement is raised, if the frame 18 is to the left of center position, switch 232 will be in the on position and will activate the solenoid 214 to retract the cylinder and move the frame 18 toward the right until both actuators 234 and 236 are in contact with the respective cam surfaces 246 and 248. If the frame 18 is too far to the right as the implement is being raised from the ground, the switch 230 will be in the on condition and will activate the solenoid 212 to extend the cylinder and move the frame 18 to the left until the cam surface 248 causes the switch 230 to change to the off condition. Therefore, as the implement 10 is raised from the ground at the end of the rows, the frame 18 will automatically be centered in a preselected position with respect to the center line of the tractor in preparation for alignment with the next set of rows to be cultivated.

To provide operator adjustment independent of the switch box 126, an operator control switch or jog switch 252 is provided in the cab of the tractor 16. The switch 252 is a momentary on, two-position switch having output terminals connected to the solenoids 212 and 214 and having an input terminal connected to the terminal 210 of the lift switch 206. As the implement is lowered to the ground-working position and the switch 206 assumes the position shown in FIG. 9, the operator can move the switch to either position to momentarily turn on one of the two solenoids 212 and 214 as necessary to align the implement with the rows. Until the implement is lowered sufficiently so that the balls 150 contact the ground and pivot the arms 144 and 146 upwardly, the notch 196 will maintain the arms in the central positions so that the switches 160–166 will be in the null or off positions as shown in FIG. 9 and conflicting signals will not be sent to the solenoids 212 and 214 as the jog switch 252 is operated.

Having described the preferred embodiment, it will be apparent that modifications can be made without departing from the scope of the invention as defined in the accompanying claims.

I claim:

1. In an implement adapted for forward movement through a field of parallel rows of plants by a towing vehicle, said field including guide marks substantially parallel to the rows, a guidance system for aligning the implement with the rows, comprising: laterally shiftable tool-carrying frame structure; activatable power means for shifting the frame structure; sensing means connected to the frame structure and shiftable therewith for sensing the transverse position of the tools relative to the rows of plants, said sensing means including a follower member having a fore-and-aft extending arm connected for rocking vertically and laterally with respect to the frame structure, and guide mark following means for engaging the guide mark and causing the arm to rock laterally as the frame structure moves laterally with respect to the rows, said sensing means also including switch means responsive to the lateral rocking of the arm for providing an indication of the transverse position of the tools relative to the rows, said arm having a preselected range of transverse positions corresponding to a range of frame transverse positions wherein the tools are properly positioned with respect to the rows; lift means for moving the tool frame vertically between ground-engaging and transport positions and for causing the arm to rock vertically as the tool frame is raised, and guide means responsive to downward movement of the arm for rocking said arm laterally to a position within said preselected range of transverse positions as the tool frame is lifted to the transport position, wherein the guide means comprises an upright guide member fixed to the frame structure for movement therewith and including a first open area receiving the arm therethrough and permitting generally unrestrained pivoting of the arm laterally for following the guide mark when the frame structure is in the ground-engaging position, said guide member including a converging portion offset vertically from the open area and terminating in an apex for receiving the arm member and permitting the arm member to settle to a central position within said preselected range as the frame structure is raised toward the transport position.

2. The invention as set forth in claim 1 including control means operably associated with the power means and responsive to the transverse position to activate the power means and shift the frame structure to move said arm within the preselected range.

3. The invention as set forth in claim 1 or 2 wherein the guide means is so located with respect to the frame structure that the apex contacts the lower side of the arm to prevent further vertical rocking of the arm prior to the frame reaching the transport position so that the guide mark following means is lifted from the ground as the frame structure is raised to the transport position.

4. The invention as set forth in claim 1 or 2 further including centering means operably associated with the power means and lift means, said centering means responsive to the lifting of the frame structure to cause the power means to move the frame structure to a preselected transverse position.

5. The invention as set forth in claim 4 wherein the power means comprises an extensible and retractable hydraulic cylinder and the centering means includes a lift switch responsive to the lifting of the frame structure by the lift means, a cylinder position switch reponsive to the extension and retraction of the cylinder, and hydraulic control means operably connected to the cylinder and the lift and cylinder switches to extend or retract the cylinder to a preselected position as the frame structure is lifted.

6. The invention as set forth in claim 1 or 2 including hitch structure adapted for connection to the towing vehicle, a pair of fore-and-aft extending parallel links pivotally connected at their forward ends to the hitch structure at transversely spaced locations thereon, and wherein the frame structure comprises a transverse beam, means pivotally connecting the aft ends of the parallel links to the transverse beam thereby forming four-bar linkage structure for permitting said beam to be rocked transversely by the power means while maintaining the beam substantially transverse to the forward direction.

7. The invention as set forth in claim 6 wherein each parallel link comprises two vertically spaced links extending rearwardly from the hitch structure adjacent opposite vertical faces of the beam, and wherein the means pivotally connecting the aft ends is located rearwardly of the beam and wherein the beam is located closely adjacent and rearwardly of the hitch structure.

8. The invention as set forth in claim 6 wherein the hitch structure is adapted to be secured against relative transverse movement with respect to the towing vehicle, and wherein the power means when unactivated prevents transverse rocking of the beam.

9. In a tractor-mounted implement connectible to the hitch of the tractor and adapted for forward movement through a field of crops planted in parallel rows, a transverse tool-carrying frame movable laterally with respect to the tractor, sensor means for sensing the lateral position of the tools relative to the rows of crops and providing an indication thereof, power means responsive to the sensor means indication for moving the frame laterally over a range of positions between first and second transverse positions to maintain a preselected lateral relationship between the tools and rows of crops, said power means including a selectively operable reciprocable member movable between first and second reciprocated positions corresponding to said first and second transverse frame positions, respectively, lift means for raising and lowering the implement between transport and ground-working positions, and first switch means responsive to raising of the implement to the transport position for selectively operating and moving the reciprocable member to an intermediate position between the first and second reciprocable positions, said location corresponding to a preselected frame transverse position between said first and second transverse positions, wherein the sensor means comprises second and third switch means for sensing movement of the tools to the left or right, respectively, from the preselected lateral relationship, valve means operatively associated with the power means and said first, second and third switch means for moving the reciprocable member, and means for controllably connecting the valve means to the first switch means as the implement is raised to the transport position and to the second and third switch means when the implement is in the transport position, said means for controllably connecting the valve means comprising a multi-position switch connected to the sensor means and to the first switch means and responsive to movement of the lift means.

10. The invention as set forth in claim 9 including four-bar linkage means connecting the tool-carrying frame to the tractor hitch for permitting said lateral movement of the frame while maintaining the frame perpendicular to the forward direction.

11. The invention as set forth in claim 9 or 10 wherein the power means includes means for selectively preventing transverse movement of the frame relative to the tractor.

12. The invention as set forth in claim 9 wherein the first switch means includes a cam member movable with the reciprocable member and a switch operable by the cam member and having a first state when the reciprocable member is between the first and the intermediate positions and a second state when the reciprocable member is between the intermediate and second positions.

13. In a tractor-mounted row crop cultivator adapted for forward movement over a field of parallel planted rows of crops, hitch structure adapted for connection to the rear of a tractor, means for fixing said hitch structure against transverse movement with respect to the tractor, first and second transversely spaced arms, each arm including a forward end connected to the hitch structure for rocking about an upright axis and a rearward end, transverse beam structure, bracket means pivotally connected to the rearward ends of the spaced arms for supporting the transverse beam structure forwardly of said pivotal connections therewith and closely adjacent the hitch structure, means for rocking the arms about the upright axes to move the beam structure laterally into alignment with the rows of crops, said means for rocking comprising a valve-controlled hydraulic cylinder, wherein said arms form four-bar linkage structure with the hitch structure and bracket means for maintaining the transverse beam structure substantially perpendicular to the forward direction as said beam structure is moved laterally, means for moving the transverse beam structure vertically between transport and field-working positions, and switch means operatively associated with the valve and responsive to the movement of the beam structure to the transport position to cause the cylinder to move the beam structure to a preselected lateral position with respect to the tractor, two row position sensor arms pivotally connected for rocking transversely with respect to a row about fore-and-aft spaced upright axes and vertically about corresponding transverse axes with respect to the beam structure as the beam structure moves laterally and vertically, respectively, sensor switch means operatively associated with the sensor arms and the valve and responsive to rocking of said sensor arms about the upright axes to control lateral movement of the transverse beam to maintain a preselected alignment of said beam with the row, said sensor switch means having a null point corresponding to the sensor arm position wherein said preselected alignment is maintained, and means for moving the sensor arm to said last-mentioned sensor arm position when the beam structure is moved toward the transport position.

14. The invention as set forth in claim 13 wherein said first and second arms extend generally above the transverse beam structure, said invention further comprising third and fourth transversely spaced arms rockably connected to the hitch structure and extending below the beam structure to pivotal connections with said beam structure generally rearwardly thereof.

15. The invention as set forth in claim 13 wherein the means for moving the sensor arm comprises a bracket limiting the transverse movement of the arm, said bracket including an upright V-shaped notch for guiding the arm to the apex of the notch as the beam structure is moved toward the transport position.

16. The invention as set forth in claim 13 wherein the hydraulic cylinder is a double-acting hydraulic cylinder and the valve locks said cylinder against movement when the beam structure is aligned with the rows of crops to prevent substantial transverse movement of the beam structure with respect to the tractor.

17. The invention as set forth in claim 13 including two upright, V-shaped notches associated with the respective sensor arms for guiding both arms to central positions as the beam structure is moved toward the transport position.

18. The invention as set forth in claim 13 further comprising an operator control switch controllably connected to the valve for selectively activating the hydraulic cylinder.

19. The invention as set forth in claim 13 or 14 wherein the arms are connected in cantilever fashion to the hitch structure by upright pivots.

20. In an implement adapted for towing forwardly by a vehicle over the ground and having a generally transverse implement frame, upright hitch structure including a supportive framework adapted for connection to the vehicle, first and second rigid arms, means pivotally connecting the arms to the framework for rocking in a generally horizontal plane about transversely spaced upright axes while preventing vertical movement of the arms with respect to the hitch structure, bracket means pivotally connecting the implement frame to the rigid arms for permitting lateral movement of said frame while maintaining the arms generally parallel to each other, said arms forming four-bar linkage structure with said supportive framework and implement frame to maintain the frame transverse to the forward direction as the frame moves laterally, third and fourth rigid arms offset vertically from the first and second arms, said third and fourth arms pivotally connected to the implement frame and the supportive framework, wherein the first and third arms, and the second and fourth arms, respectively, comprise vertically aligned and parallel arm pairs, and wherein the bracket means includes upright bracket structure connecting the ends of the arms of the respective pairs, and wherein said upright bracket structure supports a portion of the implement frame forwardly of the pivotal connection with the implement frame and rearwardly adjacent the supportive framework, and means for rocking the arms to move the frame laterally.

21. The invention as set forth in claim 20 wherein the said arms support substantially the entire weight of the implement frame.

22. The invention as set forth in claim 21 wherein the hitch structure includes three-point hitch connection means having an upper and two lower connecting points adapted for connection to the vehicle and wherein the first and second arms are generally horizontally aligned with the upper connection point, and the pivotal connections of the third and fourth arms to the supportive framework are located closely adjacent the respective two lower connecting points.

23. The invention as set forth in claim 22 wherein the supportive framework comprises upper and lower elongated transverse beams and upright connecting means for fixing the beams in parallel relation, and wherein said means pivotally connecting the arms includes a hinge portion extending above and below one of the beams and a pivot extending through said beam and hinge portions for supporting the arm in cantilever fashion from said beam.

24. The invention as set forth in claim 23 further comprising a pair of upright side members connected to the beams, said side members located adjacent opposite sides of the pivot and preventing twisting of said beam about its longitudinal axis as said arm is loaded by the weight of the implement.

25. The invention as set forth in claim 20 wherein the means for rocking the arms comprises a hydraulic cylinder having one end connected to the supportive framework and the opposite end connected to one of said arms.

26. The invention as set forth in claim 20 wherein said implement frame portion is located between the respective arms of each arm pair.

27. In an implement adapted for forward movement through a field of parallel rows of plants by a towing vehicle, said field including guide marks substantially parallel to the rows, a guidance system for aligning the implement with the rows, comprising: laterally shiftable tool-carrying frame structure; activatable power means for shifting the frame structure; sensing means connected to the frame structure and shiftable therewith for sensing the transverse position of the tools relative to the rows of plants, said sensing means including a follower member having a fore-and-aft extending arm connected for rocking vertically and laterally with respect to the frame structure, and guide mark following means for engaging the guide mark and causing the arm to rock laterally as the frame structure moves laterally with respect to the rows, said sensing means also including switch means responsive to the lateral rocking of the arm for providing an indication of the transverse position of the tools relative to the rows, said arm having a preselected range of transverse positions corresponding to a range of frame transverse positions wherein the tools are properly positioned with respect to the rows; lift means for moving the tool frame vertically between ground-engaging and transport positions and for causing the arm to rock vertically as the tool frame is raised, guide means responsive to downward movement of the arm for rocking said arm laterally to a position within said preselected range of transverse positions as the tool frame is lifted to the transport position, centering means operably associated with the power means and lift means, said centering means responsive to the lifting of the frame structure to cause the power means to move the frame structure to a preselected transverse position, and wherein the power means comprises an extensible and retractable hydraulic cylinder and the centering means includes a lift switch responsive to the lifting of the frame structure by the lift means, a cylinder position switch reponsive to the extension and retraction of the cylinder, and hydraulic control means operably connected to the cylinder and the lift and cylinder switches to extend or retract the cylinder to a preselected position as the frame structure is lifted.

28. The invention as set forth in claim 27 wherein the guide means comprises a V-shaped member movable vertically with the frame structure for contacting the arm.

29. The invention as set forth in claim 27 including hitch structure adapted for connection to the towing vehicle, a pair of fore-and-aft extending parallel links pivotally connected at their forward ends to the hitch structure at transversely spaced locations thereon, and wherein the frame structure comprises a transverse beam, means pivotally connecting the aft ends of the parallel links to the transverse beam thereby forming four-bar linkage structure for permitting said beam to be rocked transversely by the power means while maintaining the beam substantially transverse to the forward direction.

30. The invention as set forth in claim 29 wherein each parallel link comprises two vertically spaced links extending rearwardly from the hitch structure adjacent opposite vertical faces of the beam, and wherein the means pivotally connecting the aft ends is located rearwardly of the beam and wherein the beam is located closely adjacent and rearwardly of the hitch structure.

31. The invention as set forth in claim 29 wherein the hitch structure is adapted to be secured against relative transverse movement with respect to the towing vehicle, and wherein the power means when unactivated prevents transverse rocking of the beam.

* * * * *